Jan. 13, 1931.   G. C. CAPPA   1,789,271
CHANGE SPEED GEAR
Filed Dec. 13, 1929   4 Sheets-Sheet 1
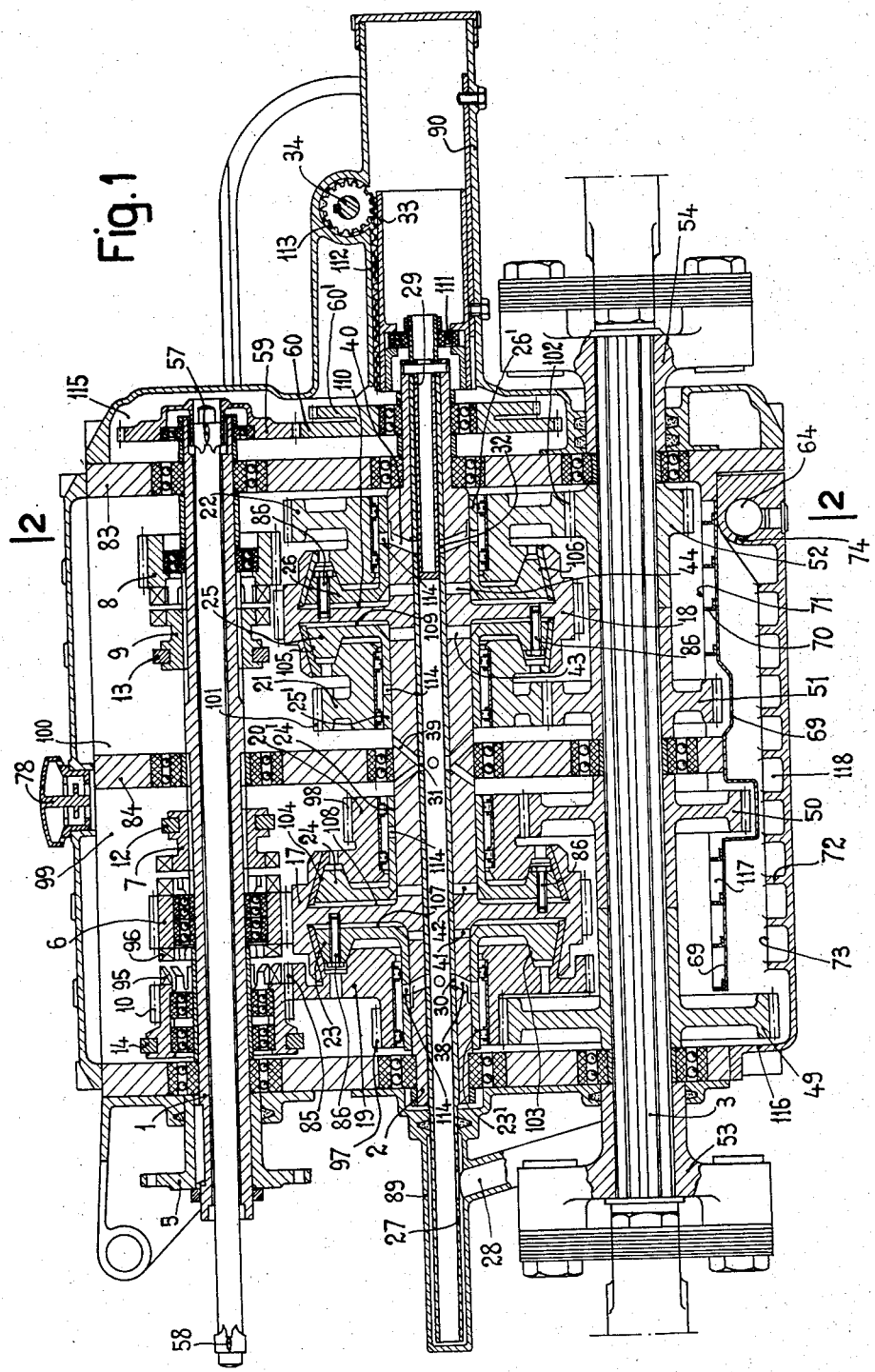
Inventor:
Giulio Cesare Cappa
By [signature]
Attorney.

Jan. 13, 1931.  G. C. CAPPA  1,789,271
CHANGE SPEED GEAR
Filed Dec. 13, 1929  4 Sheets-Sheet 2
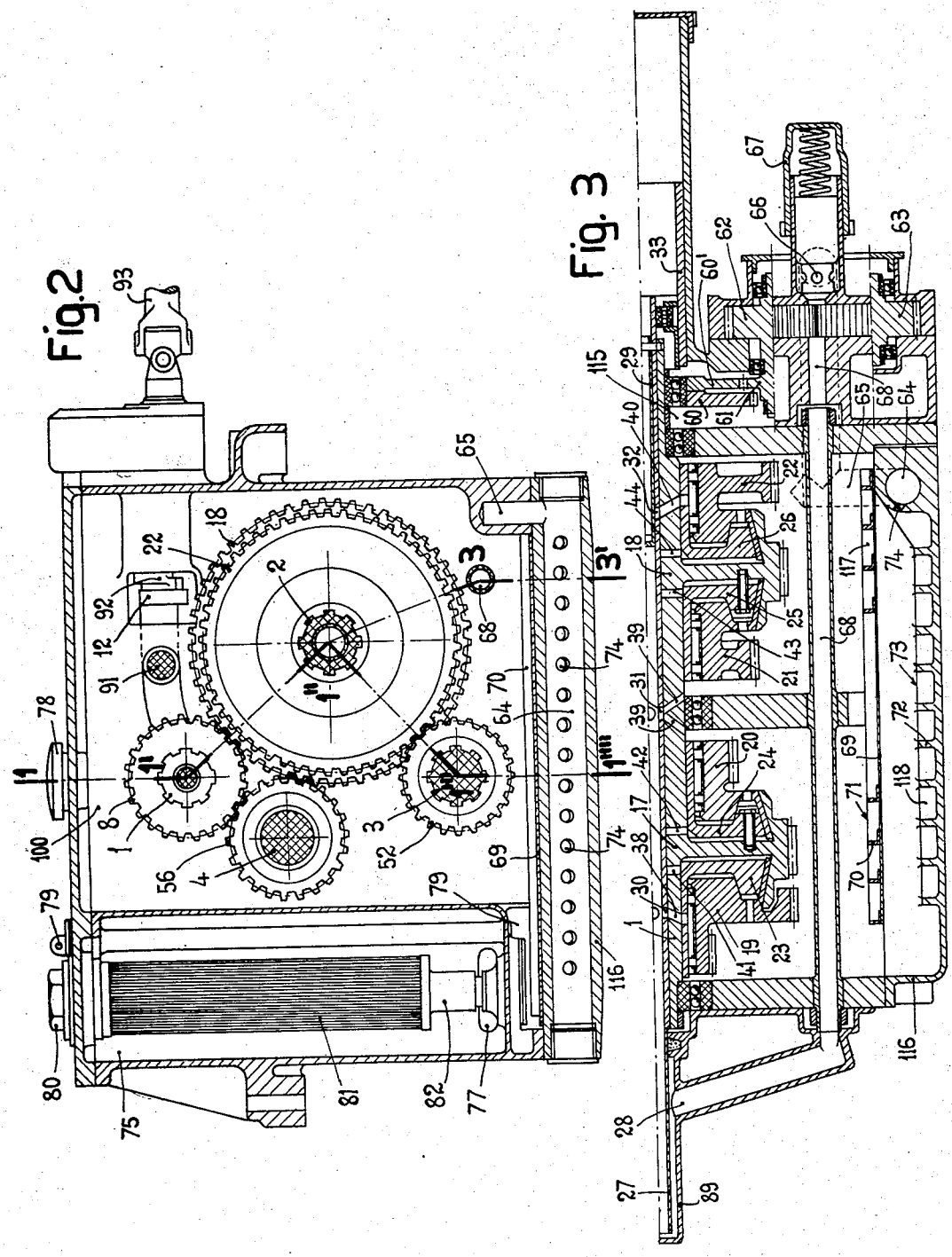
Inventor:
Giulio Cesare Cappa
By [signature]
Attorney.

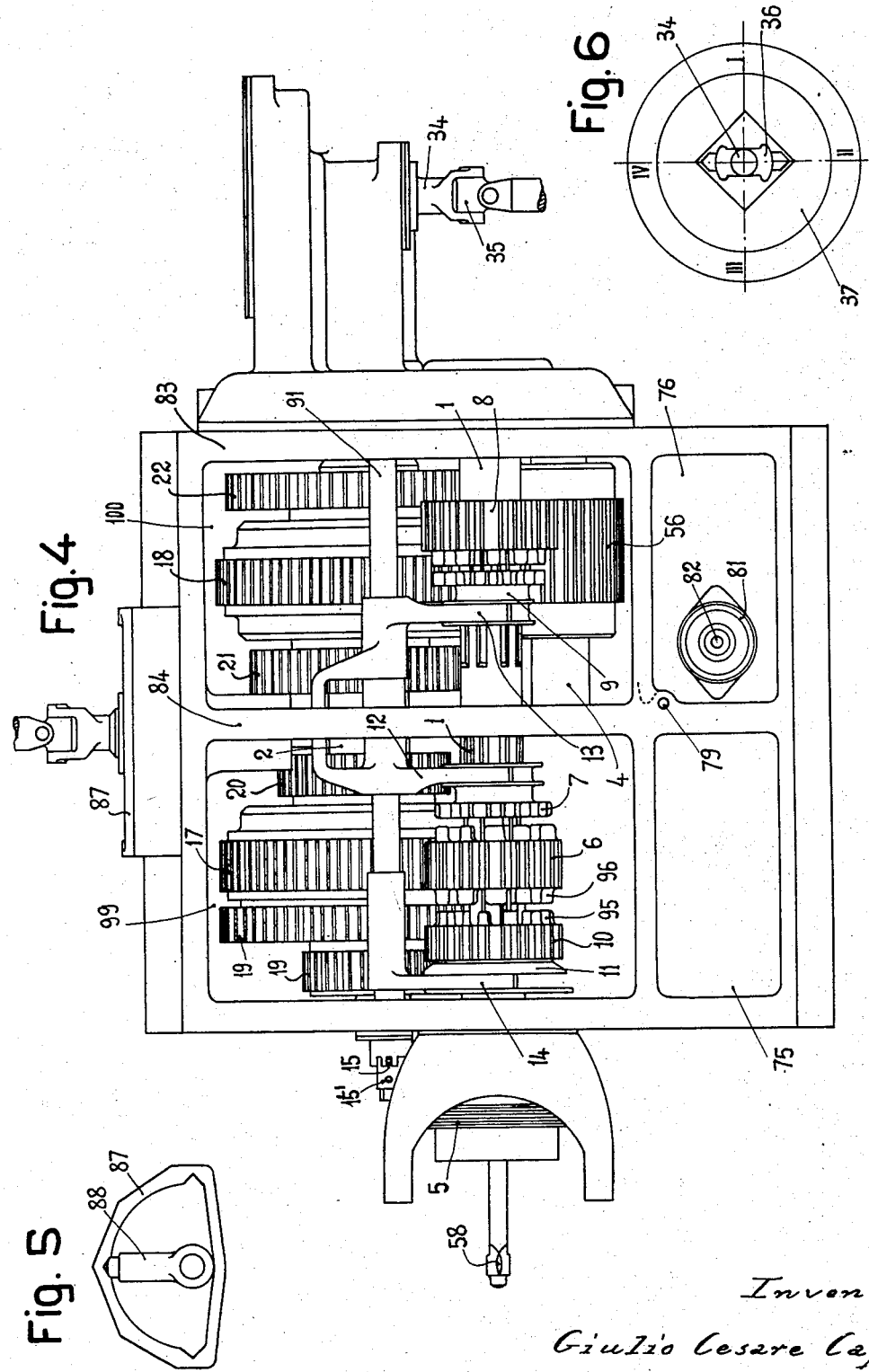

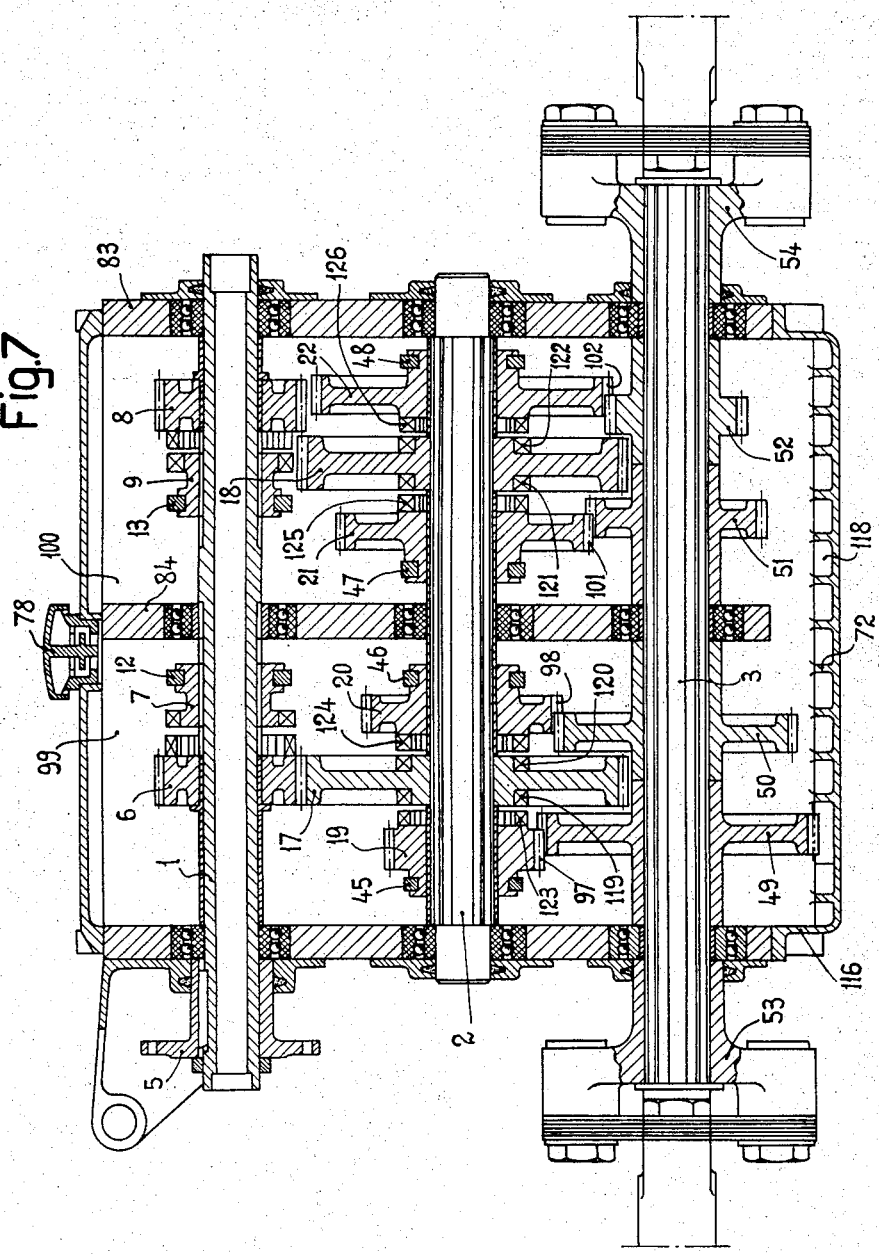

Patented Jan. 13, 1931

1,789,271

UNITED STATES PATENT OFFICE

GIULIO CESARE CAPPA, OF TURIN, ITALY, ASSIGNOR OF ONE-HALF TO C. E. M. S. A. SOCIETA COSTRUZIONI ELETTROMECCANICHE DI SARONNO, OF MILAN, ITALY, A COMPANY OF ITALY

CHANGE-SPEED GEAR

Application filed December 13, 1929, Serial No. 413,866, and in Italy December 20, 1928.

The present invention relates to transmission gears with speed change in which a driving shaft may be connected, by control means, with a secondary shaft which imparts its rotation to a driven shaft through toothed gears carried separately in operative conditions by control means independent of the first named ones.

This invention has for its object a transmission gear of this class, in which two pinions are loose on a driving shaft and are able to be made solid therewith, they meshing, one of them directly and the other one through the intermediary of an idle pinion, with two toothed wheels solid with a secondary shaft while pinions loose on said intermediate shaft and in mesh with pinions of driven shaft are able to be made solid with said toothed wheels. It is thus possible to secure the same number of speed ratios both in forward running and in reverse running, to propel a vehicle provided with this transmission gear at will in either direction under the same conditions.

This invention also includes features directed to arrangement of gears and the provision of hydraulic control means to cause the operative engagement of said loose pinions mounted on secondary shaft.

Two embodiments of a transmission gear according to this invention are shown by way of example on the annexed drawings in which:

Figure 1 is a longitudinal section of a first construction with hydraulic control, said section being made on broken line 1—1′—1″—1‴—1⁗ of Fig. 2;

Figure 2 is a transverse section on line 2—2 of Figure 1;

Figure 3 is a fragmentary section on broken line 1″—3—3′ of Figure 2;

Figure 4 is a plan view of the same gear;

Figure 5 illustrates a control quadrant for gears mounted on driving shaft;

Figure 6 shows a control quadrant for gears carried by secondary shaft;

Figure 7 is a longitudinal section, similar to Figure 1, of a transmission gear according to the present invention having mechanical control means.

In the constructions illustrated in Figures 1–6, 1 is a driving shaft, 2 is a secondary idle shaft, 3 is a driven shaft, 4 is a countershaft for reverse drive; said shafts are mounted, preferably by ball or roller bearings, in the end walls of a casing 83 and in partitions 84 of the same.

The driving shaft 1, which is hollow, carries at one end a flanged sleeve 5 for coupling it with the drive from engine (not shown), and on said shaft pinions 6 and 8 are loose, but stationary in longitudinal direction, they being able to be made solid with said shaft by means of claw coupling sleeves 7 and 9 located under the control of actuating forks 12 and 13 slidable on spindle 91 and actuated by a crank 92 and control shaft 93 as shown in Figure 2 with respect to fork 12. A further pinion 10 is loose on shaft 1 and is solid with a sleeve 11 which has at one end coupling teeth 95 adapted to engage front teeth 96 of pinion 6; pinion 10 may be moved longitudinally, for carrying it into or out of engagement, by means of a fork 14 which may be manipulated and locked by a stop pin 15 adapted to be inserted in either of positions 15—15′ as shown in Figure 4.

In register with pinion 6 is located a toothed wheel 17 meshing with said pinion 6 and integral with secondary idle shaft 2; shaft 2 has integral therewith a further toothed wheel 18 cooperating with pinion 8 through the intermediary of an idle pinion 56 mounted on shaft 4 and meshing with said pinion 8 and wheel 18 (Figure 2).

On each side of wheel 17 two disks 19 and 20 are loose on shaft 2 they having toothed rims 97 and 98 meshing respectively with pinions 49 and 50 solid with splined driven shaft 3. Disk 19 has also a toothed rim 85 in mesh with pinion 10.

Wheel 17 with disks 19 and 20 and parts hereinafter described for their coupling, and also toothed rims 97, 98 meshing with pinions 49 and 50 of driven shaft 3, provide a compact set located within compartment 99 of casing 83 which also encloses pinion 6 and its coupling sleeve 7, and pinion 10.

A similar set is provided, in casing compartment 100, consisting of toothed wheel 18 having two side loose disks 21 and 22 whose toothed rims 101—102 are in mesh with pinions 51 and 52 of the driven shaft 3. Said shaft 3 is splined for its driving engagement with pinions 49, 50, 51 and 52 and it extends outside of said casing at both ends where it is provided with flexible fork couplings 53 and 54 for its connection with the driven members of the vehicle.

To couple each of pinions 6 and 8 with shaft 1 through the intermediary of forks 12 and 13, control means similar to those described with respect to crank 92 and control shaft 93 are used, said means comprising an arm 88 adapted to take three positions on locking quadrant 87 (Figure 5); the central one of said positions corresponds with conditions of Figure 1 that is with idle running, both pinions 6 and 8 being released from shaft 1, while the right hand position corresponds with engagement of sleeve 7 with pinion 6 and therefore with forward drive, and the left hand position corresponds with the engagement of sleeve 9 with pinion 8 and therefore with reverse drive. The manipulation of said control means therefore puts the transmission gear in conditions preparatory to forward running or reverse running, independent of the actual transmission of drive.

Disks 19—20—21—22 are made operative for drive transmission by engaging a single one of them at a time with shaft 2 by control means hereinafter described and which, in the construction of Figures 1-6, are operated by fluid pressure. The manipulation of said control means therefore puts the gear in position for first, second, third or fourth speed, respectively, to produce actual transmission of the drive.

The drive of driving shaft 1 is normally transmitted to driven shaft 3 by means of either of pinions 6 or 8 of shaft 1, cooperating wheel 17 or 18 and idle pinion 56, one of disks 19—20—21—22 of shaft 2 and respective pinion 49, 50, 51 or 52 of driven shaft 3.

Thus a double set of speeds is secured: by preparatorily coupling pinion 6 with shaft 1 four forward speeds may be secured, by coupling either of disks 19—20—21—22 with cooperating wheel 17 or 18; on the contrary by preparatorily coupling pinion 8 with shaft 1 four reverse speeds may be secured by coupling either of said disks and cooperating wheel.

When the control means for coupling disks 19—20—21—22 with wheel 17 or 18 is of a fluid pressure or similar type, to secure the actual transmission of drive which would fail in the event of trouble in said control means, the driving shaft 1 may be coupled with driven shaft 3 by means of pinion 10 which may be moved along shaft 1 and coupled therewith in operative position by engagement of its teeth 95 with teeth 96 of pinion 6 which in turn is made solid with shaft 1 by coupling sleeve 7; said pinion 10 by meshing with rim 85 of disk 19 drives pinion 49 and driven shaft 3 solid therewith, through the intermediary of toothed rim 97 of disk 19 engaging said pinion 49.

As above referred to, interconnection of either of disks 19—20—21—22 with wheels 17 or 18 is made by means of fluid pressure means (Figures 1-4 and 6) comprising clutches or disks 23—24—25—26 located in recessed seats of wheels 17 and 18, and between said wheels 17 and 18 and disks 19—20—21—22 corresponding thereto, said clutch disks 23—24—25—26 being engaged in rotation with wheels 17 and 18 by means of studs 86 which provide for a longitudinal motion thereof, as permitted by their ported hubs 23', 24', 25', 26', and having friction clutch rims 103, 104, 105, 106 on their faces opposite disks 19—20—21—22; thus by shifting disks 23—24—25—26 away from either wheel 17 or 18 the friction engagement of one of disks 19—20—21—22 with the associated wheel 17 or 18 and shaft 2 is secured.

The control of movable disks 23, 24, 25, 26 is made by causing a pressure liquid, preferably oil, to act in the spaces 107, 108, 109, 110 intermediate them and cooperating wheel 17 or 18, said oil being forced by a pump (hereinafter described) through piping 68—28 (Figures 3-1).

Said piping 68—28 leads to a tubular chamber 89 located on the extension of shaft 2 which is hollow and has ports 38—39—40 opening through its wall and putting its inside in communication with the sump of the gear casing, and also ports 41, 42, 43, 44 each of which connects its inside with the space 107, 108, 109, 110 at the rear of one of disks 23, 24, 25, 26. Within shaft 2 is mounted to move longitudinally a sleeve 27 having ports 30—31—32 adapted to register with said several ports of shaft 2, in accordance with the position of sleeve 27. The sleeve 27 is connected by a part 29 and an antifriction member 111 with a drum 33 mounted to slide longitudinally in a cylindrical seat 90 and having, on a generatrix, teeth 112 in mesh with a pinion 113 solid with a spindle 34. Said spindle is connected on one side by means of a swivel coupling 35 (Figure 4) with a manipulating member which provides for rotating it, as well as with a member 36 (Figure 6) which moves on a quadrant 37 from which it is possible to detect the position of sleeve 27 and therefore the conditions of operation of the gear.

In the conditions shown in Figure 1 the parts are in idle running position, and then ports 30—31—32 of sleeve 27 are in register with ports 38—39—40 and registering ports 114 of hubs 23', 24', 25', 26'; therefore oil under pressure supplied from pipe 28 by hereinafter described means, is caused to discharge into gear casing 83 through several bushings and bearings which are thus lubricated and cooled.

In other operative positions of sleeve 27 one of its ports 30—31—32 registers with respective one of ports 41—42—43—44 of shaft 2 and therefore oil flows in space 107, 108, 109, 110 at the rear of cooperating disk 23—24—25—26 which is thus forced into engagement with its cooperating disk 19—20—21—22 and wheel 17, 18; the drive is thus transmitted under one of four speeds permitted by the gear.

In the embodiment of Figures 1-6 the fluid circulating pump is provided in the gear itself which comprises a spindle 57 (Figure 1) within the hollow shaft 1, said spindle being coupled at 58 with the engine shaft and having a pinion 59 keyed on its other end; this pinion drives a gear pump 62, 63 (Figure 3) by means of a pinion drive 60—60'—61 enclosed in a casing compartment 115 provided therefor.

Oil circulation is thus secured also when the gear is in idle running position, this feature securing an immediate operation of the gear at the time of starting, and further insuring lubrication and cooling of several members when the vehicle is stationary and the transmission gear is operating idle.

Pump 62—63 draws oil from casing sump 116 through duct 64—65 and forces it to an adjustable spring operated valve 66—67 which reduces its pressure and leads it into tube 68 and therefore into pipe 28, casing 89 and sleeve 27.

The pressure of oil supplied to pipe 28 could be generated by a circulating pump of any other construction.

To clean the oil discharged through shaft 2 in idle running position and through valve 66—67 when the gear is in driving position, said oil is collected by a horizontal sheet-metal tray 69 having transverse and longitudinal partitions 70—71 providing a number of decantation chambers 117 in which the heavier impurities conveyed by oil are collected. Oil overflowing from said chambers 117 passes then into sump 116 having in turn a series of transverse and longitudinal ribs 72 and 73 providing a number of decantation chambers 118 which secure removal of lighter impurities. Finally oil passing to the pump through the suction duct 64—65 flows through perforations 74 which may be provided with a filter gauze.

The oil is stored in two chambers 75—76 (Figs. 2 and 4) cast integral with gear casing 83 and intercommunicating at their bottom at 77 (Fig. 2). The gear casing 83 is in communication with the atmosphere by means of vents 78 (Fig. 1) and 79 (Fig. 2), while the space inside the reservoir 75 is sealed to prevent the entrance of air from outside. To fill reservoir 75 a plug 80 is provided which opens in an inner space having a filter 81 and a safety valve (not shown) permitting of filling it without entrance of air from outside.

Such an arrangement provides for securing a suitably low and constant oil level in the gear sump 116, while maintaining a materially high oil level in said reservoir 75. Thus a large body of lubricating oil is stored which acts also to dissipate heat absorbed during its circulation.

Figure 7 shows a construction in which the control to couple one of disks 19—20—21—22 with shaft 2, instead of being secured by hydraulic means, is secured by mechanical means. In this construction wheels 17 and 18 have coupling claws 119, 120, 121, 122 on each of their faces and disks 19—20—21—22 carrying toothed rims 97, 98, 99, 100 intended to mesh with pinions 49—50—51—52 of driven shaft 3 are provided with cooperating claw couplings 123, 124, 125, 126 and are engaged with forks 45—46—47—48 which are actuated separately by control means adapted to carry each time one of disks 19—20—21—22 in engagement with cooperating wheel 17 or 18 or to leave all said disks loose.

As to the transmission intermediate the driving shaft and the driven shaft, the conditions are entirely similar to those described in respect to construction embodying hydraulic control means.

In both constructions, for operation, when both pinions 6 and 8 are released, the gear is idle; when either of said pinions is made solid with shaft 1 and either of disks 19, 20, 21, 22 is made solid with adjacent wheel 17 or 18 and therefore with secondary shaft 2, the drive is transmitted from shaft 1 to shaft 2 and then to shaft 3 by means of the one of disks 19, 20, 21, 22 which has meshed with shaft 2 and cooperates with one of pinions 49, 50, 51, 52; when pinion 8 is engaged with shaft 1, the rotation of shaft 3 is reversed owing to operation of idle pinion 56.

Furthermore, in the construction of Figures 1-6 the drive may be imparted to shaft 3 by coupling pinion 6 with shaft 1 and pinion 10 with said pinion 6 and leaving all other members loose, the drive being then through 10, 85, 19, 97, 49 to shaft 3.

The gearing according to this invention provides for securing a high speed reduction intermediate driving shaft 1 and driven shaft 3, such a feature removing necessity for inserting a reducing gear intermediate driven shaft 3 and driven members of the vehicle.

The arrangement of toothed wheels of shaft 2 which receive the drive from shaft 1, and of control means on two sides of the same provides a compact construction which therefore is quite strong and requires a reduced space.

Finally the use of a driven shaft extending from gear casing at its two ends provides for direct drive both to front wheel set and rear wheel set of the vehicle on which this transmission gear is mounted.

What I claim as my invention and desire to secure by United States Letters Patent is:

1. A transmission gear with pinion speed change, comprising a driving shaft, a secondary idle shaft and a driven shaft journalled in a casing, two driving pinions loose on said driving shaft, means for engaging either of said driving pinions with said driving shaft, a toothed wheel fast with said secondary idle shaft and meshing with one of said driving pinions, an idle pinion meshing with the other one of said driving pinions, a second toothed wheel fast with said secondary idle shaft and meshing with said idle pinion, a loose pinion at each side of each of said toothed wheels on said secondary idle shaft, means for selectively engaging any of said loose pinions with said toothed wheel adjacent thereto, and driven pinions fast with said driven shaft and each meshing with one of said loose pinions.

2. A transmission gear with pinion speed change, comprising a driving shaft, a secondary idle shaft and a driven shaft journalled in a casing, two driving pinions loose on said driving shaft, means for engaging either of said driving pinions with said driving shaft, a toothed wheel fast with said secondary idle shaft and meshing with one of said driving pinions, an idle pinion meshing with the other one of said driving pinions, a second toothed wheel fast with said secondary idle shaft and meshing with said idle pinion, a loose pinion at each side of each of said toothed wheels on said secondary idle shaft, claw coupling means on each of said pinions and toothed wheels, driven pinions fast with said driven shaft and each meshing with one of said loose pinions, and means for selectively operating said claw coupling means.

3. A transmission gear with pinion speed change, comprising a driving shaft, a secondary idle shaft and a driven shaft, means at both ends of said driven shaft for connection with parts to be driven by the gear, a casing in which all of said shafts are journalled, two driving pinions loose on said driving shaft, means for engaging either of said driving pinions with said driving shaft, a toothed wheel fast with said secondary idle shaft and meshing with one of said driving pinions, an idle pinion meshing with the other one of said driving pinions, a second toothed wheel fast with said secondary idle shaft and meshing with said idle pinion, a set of loose pinions for each of said toothed wheels on said secondary idle shaft, said set of pinions comprising one pinion on each side of each of said toothed wheels, means for selectively engaging any of said loose pinions with said toothed wheel adjacent thereto, and driven pinions fast with said driven shaft and each meshing with one of said loose pinions.

4. A transmission gear with pinion speed change, comprising a casing, a driving shaft, a secondary idle shaft and a driven shaft journalled in said casing, toothed wheels fast with said secondary idle shaft, means on said driving shaft for imparting rotary motion to either of said toothed wheels, a loose pinion on said secondary shaft at each side of each of said toothed wheels, pinions on said driven shaft each meshing with one of said loose pinions, a friction clutch member intermediate each of said loose pinions and the toothed wheel adjacent thereto, and liquid pressure means for actuating said friction clutch members.

5. A transmission gear with pinion speed change, comprising a casing, a driving shaft, a secondary idle shaft and a driven shaft journalled in said casing, a toothed wheels fast with said secondary idle shaft, means on said driving shaft for imparting rotary motion to either of said toothed wheels, a loose pinion on said secondary shaft at each side of each of said toothed wheels, pinions on said driven shaft each meshing with one of said loose pinions, a friction clutch member intermediate each of said loose pinions and the toothed wheel adjacent thereto, sliding means for connecting each of said clutch members with the toothed wheel adjacent thereto and liquid pressure means for urging said friction clutch members against its cooperating loose pinion.

6. A transmission gear with pinion speed change, comprising a casing, a driving shaft, a secondary idle shaft and a driven shaft journalled in said casing, toothed wheels fast with said secondary idle shaft, means on said driving shaft for imparting rotary motion to either of said toothed wheels, a loose pinion on said secondary shaft at each side of each of said toothed wheels, pinions on said driven shaft each meshing with one of said loose pinions, a friction clutch member intermediate each of said loose pinions and the toothed wheel adjacent thereto, pins projecting from each side of each of said toothed wheels in a direction parallel with the axis of said secondary shaft, said pins being engaged in holes of said clutch members adjacent thereto, and liquid pressure means for selectively acting on any one of said clutch members to urge it against its cooperating loose pinion.

7. A transmission gear with pinion speed change, comprising a casing, a driving shaft, a secondary idle shaft and a driven shaft journalled in said casing, toothed wheels fast with said secondary idle shaft, means on said driving shaft for imparting rotary motion to either of said toothed wheels, a loose pinion on said secondary shaft at each side of each of said toothed wheels, pinions on said driven shaft each meshing with one of said loose pinions, a friction clutch member intermediate each of said loose pinions and the toothed wheel adjacent thereto, a cooperating wedge-shaped rim and groove on opposite faces of each of said clutch members and adjacent loose pinions, and liquid pressure means for acting on any one of said clutch members to urge it against its cooperating loose pinion.

8. A transmission gear with pinion speed change, comprising a casing, a driving shaft, a secondary hollow idle shaft and a driven shaft journalled in said casing, toothed wheels fast with said secondary idle shaft, means on said driving shaft for imparting rotary motion to either of said toothed wheels, a loose pinion on said secondary shaft at each side of each of said toothed wheels, pinions on said driven shaft each meshing with one of said loose pinions, a movable disc intermediate each of said loose pinions and the toothed wheel adjacent thereto, each of said discs defining a chamber between itself and the adjacent toothed wheel, said secondary hollow shaft having holes, each opening in one of said chambers, means for feeding a liquid under pressure in said hollow secondary shaft and means for selectively opening the one of said holes leading to any of said chambers for urging the respective disc against its cooperating loose pinion to couple it with the respective toothed wheel.

9. A transmission gear with pinion speed change, comprising a casing, a driving shaft, a secondary hollow idle shaft and a driven shaft journalled in said casing, toothed wheels fast with said secondary idle shaft, means on said driving shaft for imparting rotary motion to either of said toothed wheels, a loose pinion on said secondary shaft at each side of each of said toothed wheels, pinions on said driven shaft each meshing with one of said loose pinions, a movable disc intermediate each of said loose pinions and the toothed wheel adjacent thereto, each of said discs defining a chamber between itself and the adjacent toothed wheel, said secondary hollow shaft having holes each opening in one of said chambers, means for feeding a liquid under pressure in said hollow secondary shaft, and a hollow member in said hollow secondary shaft having ports adapted to register selectively with said holes of said hollow secondary shaft for supplying liquid under pressure into any of said chambers for urging the respective disc against its cooperating loose pinion to couple it with the respective toothed wheel.

10. A transmission gear with pinion speed change, comprising a casing, a driving shaft, a. secondary idle shaft and a driven shaft journalled in said casing, toothed wheels fast with said secondary idle shaft, means on said driving shaft for imparting rotary motion to either of said toothed wheels, a loose pinion on said secondary shaft at each side of each of said toothed wheels, pinions on said driven shaft each meshing with one of said loose pinions, a friction clutch member intermediate each of said loose pinions and the toothed wheel adjacent thereto, a pump, connecting means between the driving shaft and the pump, and liquid passage means between the pump and clutch members, whereby liquid under pressure is supplied for actuating any of said friction clutch members.

In testimony whereof, I affix my signature.

GIULIO CESARE CAPPA.